(12) United States Patent
Paratte et al.

(10) Patent No.: US 7,738,323 B2
(45) Date of Patent: Jun. 15, 2010

(54) ARRANGEMENT FOR THE MECHANICAL INTERFACING OF A MEMS MICROMOTOR WITH A CLOCK WHEEL AND TIMEPIECE COMPRISING THIS ARRANGEMENT

(75) Inventors: Lionel Paratte, Neuchâtel (CH);
Jean-Philippe Rebeaud, Cressier (CH);
André Zanetta, Neuchâtel (CH); Fabien Blondeau, Le Landeron (CH); Martin Bisig, Zuchwil (CH); Pierre-André Meister, Bienne (CH); Nicolas Golay, Neuchâtel (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 11/939,116

(22) Filed: Nov. 13, 2007

(65) Prior Publication Data
US 2008/0111449 A1 May 15, 2008

(30) Foreign Application Priority Data
Nov. 13, 2006 (EP) .................................. 06123972

(51) Int. Cl.
*G04F 5/00* (2006.01)
(52) U.S. Cl. ......................................... 368/157; 74/575
(58) Field of Classification Search ................. 368/157;
310/311; 74/128, 575
See application file for complete search history.

(56) References Cited

U.S. PATENT DOCUMENTS

| 2,963,915 | A | * | 12/1960 | Straub ............................ 74/88 |
| 3,693,344 | A | * | 9/1972 | Cleusix ......................... 368/22 |
| 3,828,546 | A | * | 8/1974 | Saito et al. .................... 368/22 |
| 5,493,156 | A | | 2/1996 | Okada |
| 5,631,514 | A | | 5/1997 | Garcia et al. |
| 5,959,376 | A | | 9/1999 | Allen |
| 6,069,419 | A | | 5/2000 | Tabib-Azar |
| 6,137,206 | A | | 10/2000 | Hill |
| 6,211,599 | B1 | | 4/2001 | Barnes et al. |
| 6,313,562 | B1 | | 11/2001 | Barnes et al. |

(Continued)

FOREIGN PATENT DOCUMENTS

CH 695 395 4/2006

(Continued)

OTHER PUBLICATIONS

Notice of Allowance issued in related co-pending U.S. Appl. No. 11/939,166, dated Jun. 26, 2008.

(Continued)

*Primary Examiner*—Vit W Miska
*Assistant Examiner*—Sean Kayes
(74) *Attorney, Agent, or Firm*—Griffin & Szipl, P.C.

(57) ABSTRACT

The invention proposes an arrangement for the mechanical interfacing of a micromotor of the MEMS type with a toothed wheel in which the micromotor is produced in the upper layer of a plate made of crystalline or amorphous material and comprises at least one actuator which drives a rotor in rotation, characterised in that a pinion, coaxial with the rotor and arranged above the rotor, is connected in rotation to the rotor by means of at least one pin which is received in an associated housing and in that the pinion meshes with the toothed wheel.

12 Claims, 6 Drawing Sheets

U.S. PATENT DOCUMENTS

| | | |
|---|---|---|
| 6,402,969 B1 | 6/2002 | Rodgers et al. |
| 6,657,360 B2 | 12/2003 | Jerman et al. |
| 7,315,006 B2 * | 1/2008 | Houck et al. ................ 200/331 |
| 2004/0119354 A1 | 6/2004 | Takada et al. |
| 2004/0156274 A1 * | 8/2004 | Miyazawa et al. .......... 368/255 |
| 2005/0100748 A1 | 5/2005 | Cook et al. |
| 2007/0069604 A1 | 3/2007 | Bourbon et al. |
| 2007/0126300 A1 | 6/2007 | Greywell |

FOREIGN PATENT DOCUMENTS

| | | |
|---|---|---|
| EP | 0403179 | 12/1990 |
| FR | 2101203 | 3/1972 |
| FR | 2874907 | 3/2006 |
| GB | 2293662 | 4/1996 |
| WO | 2004 081695 A2 | 9/2004 |
| WO | 2006 024561 A1 | 3/2006 |
| WO | 2006 097516 A1 | 9/2006 |

OTHER PUBLICATIONS

European Search Report issued in corresponding application No. EP 06 12 3972, completed May 2, 2007.

* cited by examiner

ARRANGEMENT FOR THE MECHANICAL INTERFACING OF A MEMS MICROMOTOR WITH A CLOCK WHEEL AND TIMEPIECE COMPRISING THIS ARRANGEMENT

This application claims priority from European Patent Application No. 06123972.9, filed Nov. 13, 2006, the entire disclosure of which is incorporated herein by reference.

FIELD OF THE INVENTION

The present invention relates to an arrangement for the mechanical interfacing of a micromotor with a wheel and a timepiece comprising this arrangement.

The invention relates more particularly to an arrangement for the mechanical interfacing of a micromotor of the MEMS type with a toothed wheel in which the micromotor is produced in the upper layer of a plate made of crystalline or amorphous material and comprises at least one actuator which drives a rotor in rotation.

BACKGROUND OF THE INVENTION

In silicon microactuators, one means of converting electrostatic energy into work is to dispose structures "as a comb", formed respectively by moveable and fixed fingers and set at two different potentials. The moveable fingers are attached to the combs, themselves attached to a nacelle guided linearly by springs. These actuators are produced by photolithography and dry plasma attack of monocrystalline silicon layers having a thickness typically of 50 to more than 200 microns.

In order to make a clock wheel turn, it is necessary to convert the linear movement into rotational movement, via a ratchet system for example, as in the case of Accutron watches by Bulova (USA), Mosaba by ETA or via a hysteresis system such as described in the document WO 2004/081695. The linear movement on silicon being of the order of a few tens of microns, the ratchet driven by the pawls must have teeth of equivalent dimensions. In order to ensure reliable meshing, the positioning of this ratchet relative to the moveable fingers must by within tolerances which are much lower than the some tens of microns mentioned earlier.

In order to produce such a mechanical interfacing between the linear movement of a pawl actuator and the rotational movement, the document WO 2006/024651 proposes using microactuators which drive, by means of a tooth in a hysteresis movement, a micromanufactured wheel with very small teeth, which is coaxial and integral with a clock pinion. This solution implies an adjustment of the microactuators relative to the wheel for each assembled piece because the radial positioning tolerance of one mechanism axle, for example a plain bearing made of steel on ruby, is of the order of 40 microns. One solution can be to integrate a spring system on the MEMS in order to take up the positioning clearance, such as a bending mechanism of the ratchets, which is proposed in the document WO 2006/97516. The positioning is therefore ensured but the pawls or any other mechanism made of silicon therefore protrude directly on the side of the chip which makes manipulation during assembly more difficult and also its exposure to dust more direct.

The invention aims to resolve these problems by proposing an arrangement in which the microactuator drives a silicon rotor positioned on the same substrate as the microactuator. The invention aims to make the micromotor and the mechanism independent at the level of their radial clearances (radial play), whilst allowing transmission of the pure torque from one to the other.

SUMMARY OF THE INVENTION

To this end, the invention proposes an arrangement of the type mentioned previously, characterised in that a pinion, coaxial with the rotor and arranged above the rotor, is connected in rotation to the rotor by means of at least one pin which is received in an associated hole/slot and in that the pinion meshes with the toothed wheel.

According to other features of the invention:
the rotor comprises a plurality of holes/slots that are distributed angularly in a regular manner about the axis of rotation of the rotor, and the pins are integral with the pinion;
the pins are produced in a single piece with the pinion;
each pin is received in the associated hole/slot with a radial functioning clearance (radial play) and a circumferential functioning clearance (circumferential play) determined by design, wherein the radial clearance (radial play) is provided by clearance between surfaces forming the plurality of holes in the rotor and the off-set pins of the pinion;
the upper layer of the plate comprises at least one support surface orientated towards the top of the plate, and the pinion is provided to abut against this surface when an axial force orientated towards the bottom of the plate is applied to the pinion;
the rotor is guided in rotation by a shaft mounted in the plate;
the rotor is guided in rotation by the same shaft as the pinion;
the pinion meshes with the wheel in a meshing zone situated close to an exterior circumferential edge of the plate;
the rotor is driven in rotation by the actuator by means of a pawl, and the ratcheting zone is offset angularly relative to the meshing zone.

The invention also proposes a timepiece which comprises an arrangement according to one of the preceding features for the mechanical interfacing of a wheel of a gear-train of the timepiece with a micromotor of the timepiece.

BRIEF DESCRIPTION OF THE DRAWINGS

Other features and advantages of the present invention will appear more clearly upon reading the following detailed description, with reference to the annexed drawings which are given by way of non-limiting example and in which.

DETAILED DESCRIPTION OF THE ILLUSTRATIVE EMBODIMENTS

Figure 1:
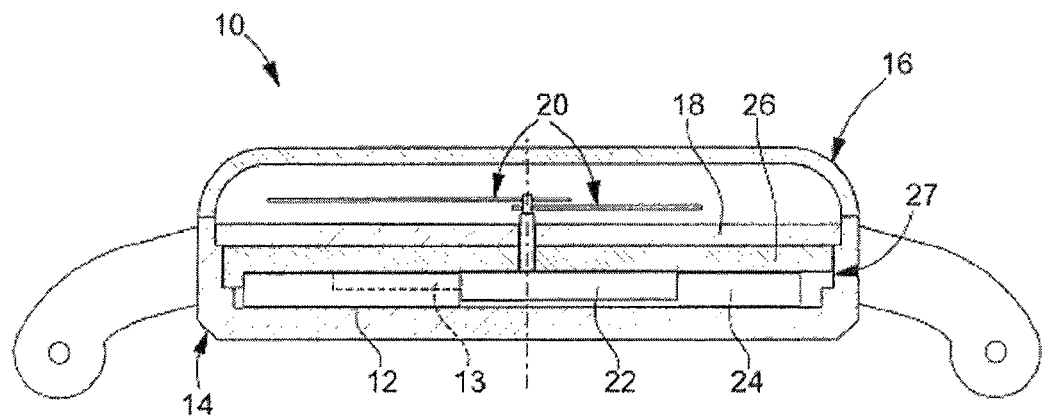
FIG. 1 is a sectional view in which represents schematically a timepiece produced according to the teachings of the invention.

In FIG. 1, a timepiece 10 is represented schematically, comprising a wristwatch equipped with a driving module 13 according to the teachings of the invention, the driving module 13 being arranged here inside a casing 12.

The timepiece 10 comprises a watch casing 14 closed by a crystal 16, a dial 18 and analogical display means here comprising hands 20. The hands 20 are provided in order to be driven in rotation by the driving module 13 according to the invention, via a gear-train 22 comprising for example reduction means. The driving module 13 is supplied with electrical energy by a battery 24. The casing 12, the driving module 13, the gear-train 22 and the battery 24 are mounted here on a plate 26 and together form the movement 27 of the timepiece 10, this movement 27 being fixed inside the watch casing 14. Of course, the movement 27 comprises other elements (not represented), in particular an electronic module comprising an integrated circuit, a time base comprising a quartz, a printed circuit board etc.

Figure 2:
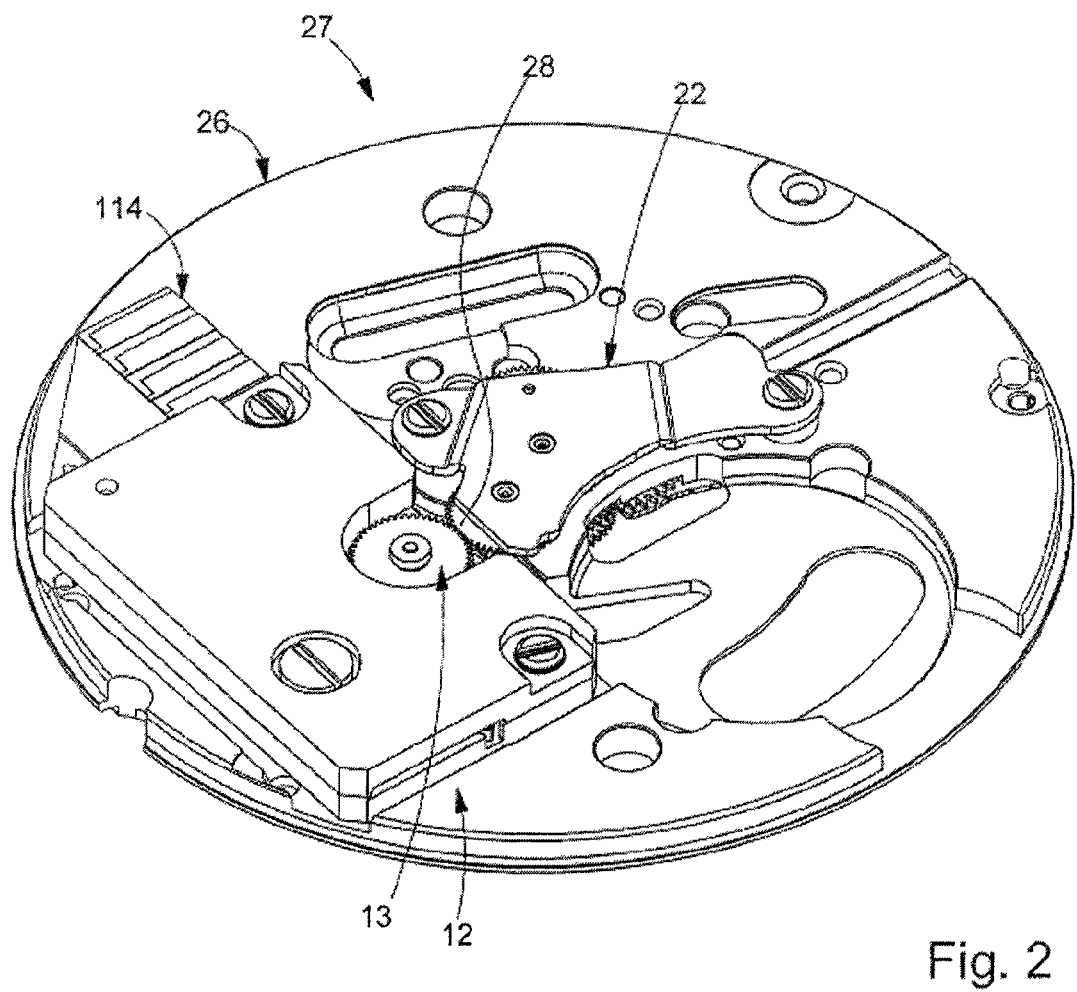
FIG. 2 is a perspective view which partially represents the movement of the timepiece of FIG. 1, equipped with a driving module comprising a MEMS micromotor.

In FIG. 2, a part of the movement 27 of the timepiece 10, in particular the plate 26, is represented, on which the casing 12 and the gear-train 22 are mounted.

The driving module 13 is intended to mesh with a timepiece wheel, termed input wheel 28 of the gear-train 22.

The various elements of the driving module 13 according to the invention are represented in more detail in FIGS. 3 to 7.

The driving module 13 comprises a plate 30 made of crystalline or amorphous material, for example silicon, comprising a lower layer which forms a substrate 32 and an upper layer 34 in which a micromotor 36 of the MEMS type (Micro Electro Mechanical System) is etched. The micromotor 36 is formed here by two actuators 38, 40 which drive a rotor 42 which is etched in the upper layer 34 in rotation.

Each actuator 38, 40 comprises a stylus 44, 46, moveable following a direction A1, A2 parallel to the plane of the plate 30. Each stylus 44, 46 is provided, on its free end, with a pawl 48, 50 which is provided to cooperate with a ratchet toothing 52 provided on the exterior circumferential edge of the rotor 42 in order to drive it in rotation sequentially.

Preferably, each stylus 44, 46 extends following a direction A1, A2 which cuts the associated actuator 38, 40 in two overall symmetrical parts.

Preferably, a first actuator 38 comprises a thrust pawl 48 and a second actuator 40 comprises a traction pawl 50.

Each actuator 38, 40 is of the electrostatic type with interdigited combs and produced by etching in the silicon plate 30. The plate 30 here is of the Silicon On Insulator (SOI) type and comprises a thick lower layer 32 of the silicon substrate, an intermediate layer 54 of silicon oxide and an upper layer 34 made of silicon of a lesser thickness than the substrate 32.

The fixed part of each actuator 38, 40 comprises a supply pad 56, 58 provided to be connected electrically to the electronic module, and the moveable part of each actuator 38, 40 comprises a contact pad 57, 59 which places these moveable parts at a predetermined potential, here at zero volts.

A micromotor comprising electrostatic actuators produced in a silicon plate is described and represented for example in the document WO 2004/081695, incorporated here by reference. In this document, the motor is produced by etching in a silicon layer. It comprises a toothed driving wheel and actuating fingers which cooperate with the teeth of the wheel in order to induce its rotation. Each actuating finger is integral in displacement with a moveable comb which is displaced relative to a fixed comb as a function of a voltage applied to the fixed comb.

An embodiment using an SOI plate is described with reference to FIGS. 7A to 7D in the document mentioned above.

According to an advantageous embodiment, each actuator 38, 40 is associated with a passive pawl 49, 51, the ratcheting zone of which is situated between the meshing zone 70 and the ratcheting zone of the associated ratchet. These passive pawls 49, 51 are maintained elastically meshed with the rotor 42 in order to ensure precise angular positioning, in particular in the course of the driving phases, when the other pawls 48, 50 are displaced.

According to the embodiment represented in FIGS. 3 to 7, the rotor 42 is guided by a central plain bearing 60 which is integrated or inserted, produced at the same time as the pawls 48, 50 and having diametric clearance (play) of between 4 and 10 microns, the approximate lower limit corresponding to a silicon layer thickness of 80 microns. The pawls 48, 50 will function well if they act on a tangential course which is significantly greater than this clearance (play), i.e. typically between 20 and 100 microns. This corresponds well to the range of possible courses with guidance of the styli 44, 46 by deflecting springs (not shown).

Figure 7:
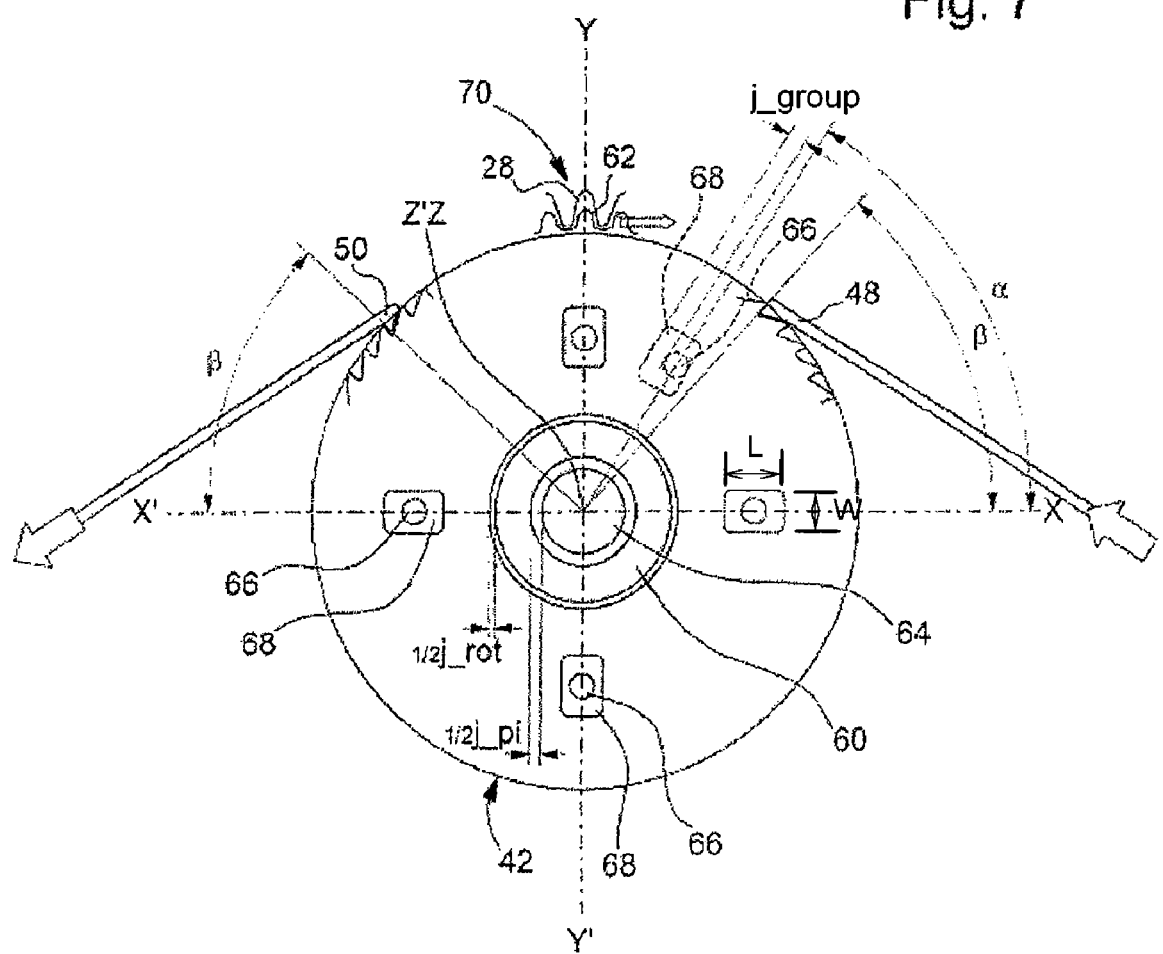
FIG. 7 is schematic view from above which illustrates the driving of the pinion by the rotor by means of pins.

The torque of the rotor 42 is transmitted to a pinion 62 by a system similar to a crank. The pinion 62 situated just above the rotor 42 is coaxial with the latter and it is guided by a central shaft 64 defining a central axis (axis z'z) along the shaft. The pinion 62 is provided with pins 66 which are engaged in the slots 68 of the rotor 42. Operating clearances (play) j_group, j_rot, j_pi are provided between the various elements of the rotor 42 and of the pinion 62 as represented in the diagram of FIG. 7. Thus rotor 42 and pinion 62 are coupled in rotation angularly and they move independently in a radial direction with respect to the axis z'z: the clearances (play) in the plane xy are taken up by the bearing 60 for the rotor 42 and by the shaft 64 for the pinion 62. Hence the radial reaction force due to the load is not taken up by the bearing 60 at the level of the rotor 42 but by the guidance of the pinion 62 by the shaft 64. Therefore, the micromanufactured elements of the micromotor 36 are protected from larger forces exerted by the timepiece elements, in the case of impacts for example.

The pinion 62 is provided in order to mesh with the input wheel 28 of the mechanism 22 in a meshing zone 70 situated near to an exterior circumferential edge 72 of the plate 30.

According to an advantageous feature, the rotor 42 is provided on the plate 30 in order to minimise the distance D between the toothing 52 of the rotor 42 and the exterior circumferential edge 72 of the plate 30 corresponding to the meshing zone 70. Furthermore, the exterior diameter of the pinion 62 is slightly greater than that of the rotor 42 in order to project relative to the plate 30 in the meshing zone 70.

In order to simplify the diagram of FIG. 7, a rotor 42 is represented, comprising merely four slots/holes 68 and a pinion 62, which comprises only four pins 66, wherein each hole of the plurality of holes has a length (L) and a width (W), wherein the length (L) is greater than the width (W), and the length (L) is oriented in a radial direction with respect to the axis z'z of the central shaft. According to an advantageous embodiment, such as illustrated in particular by FIGS. 3 and 4, eight slots/holes 68 and eight pins 66 are provided.

According to a preferred embodiment, the angular position of the ratcheting zone of each pawl 48, 50 with the rotor 42 is offset angularly relative to the meshing zone 70. The ratcheting zone of each pawl 48, 50 forms an angle β with the axis x'x. α represents the angle, at a given moment, between the radius passing through the pin 66 which abuts, in engagement, against the edge of its slot 68/hole, and the axis x'x (FIG. 7).

Then, a judicious choice of all the parameters {α, β, j_rot, j_pi, j_group} for the given radii of pinion 62, rotor 42 and the circle of pins 66 will assist the efficiency of the transmission of mechanical energy from the rotor 42 to the pinion 62. Hence for a particular case of the invention having β=45°, if the clearances (play) are well adjusted, the efficiency for a system with four pins approaches 85%, which improves the efficiency relative to a case where the rotor 42 and the pinion 62 are glued one to the other. In fact, in this latter case, all the load would be in the form of lateral silicon-silicon friction at the level of the bearing 60, and vertical between the circumference of the rotor 42 and the substrate 32 because of the pivoting torque. However the silicon-silicon friction is somewhat unfavourable, with dry static coefficients approaching 0.4.

This transmission solution makes it possible again to vary the diameter of the pinion 62 in order to adapt the torques and the speeds, according to the loads. Moreover if the pinion 62 is large enough and protrudes beyond the circumferential edge 72 of the plate 30, the meshing via the cut is found to be simplified, and the driving module 13 can be assembled on the plate 26 of the timepiece 10 in a modular manner, i.e. without dismantling/reassembling the driven wheel 28.

According to various variants:
- the rotor 42 is micromanufactured in place, and on the same substrate 32 as the actuators 38, 40 in order to ensure matching to the bearing 60 and to the pawls;
- another variant comprises manufacturing a rotor 42 separately, on the same wafer or on another wafer, this rotor 42 being then assembled on the plate 30 or stator. This allows a reduction in the radial clearance (radial play) if desired in the case where the rotor is guided by the bearing 60;
- a family of variants is formed by the rotors 42 and/or the pinions 62 which are micromanufactured by methods other than DRIE machining (laser cutting, EDM, LIGA, microinjection, etc.) then assembled on the plate 30 to the stator;
- another family of variants is formed by pins 66 formed by a second photolithographic level in the pinion 62 and/or in the rotor 42.

The driving module 13 according to the invention allows increased modularity for adaptation to the load, by allowing the use of pinions 62 of various diameters, without modifying the rest of the module 13. Thus an increased modularity is also obtained for the assembly because the mechanical interface for the connection to the timepiece gear-train 22 is already present thanks to the presence of the pinion 62, integrated into the driving module 13 and connected in rotation to the micromotor 36.

The pinion 62 can be produced in metal such as brass, with pins connected pins 66 also produced in metal. The pinion 62 can also be produced in a single piece with the pins 66 by moulding in plastic material. Production of the pinion 62 in plastic material with metallic pins 66 which are moulded on is also conceivable.

Figure 4:
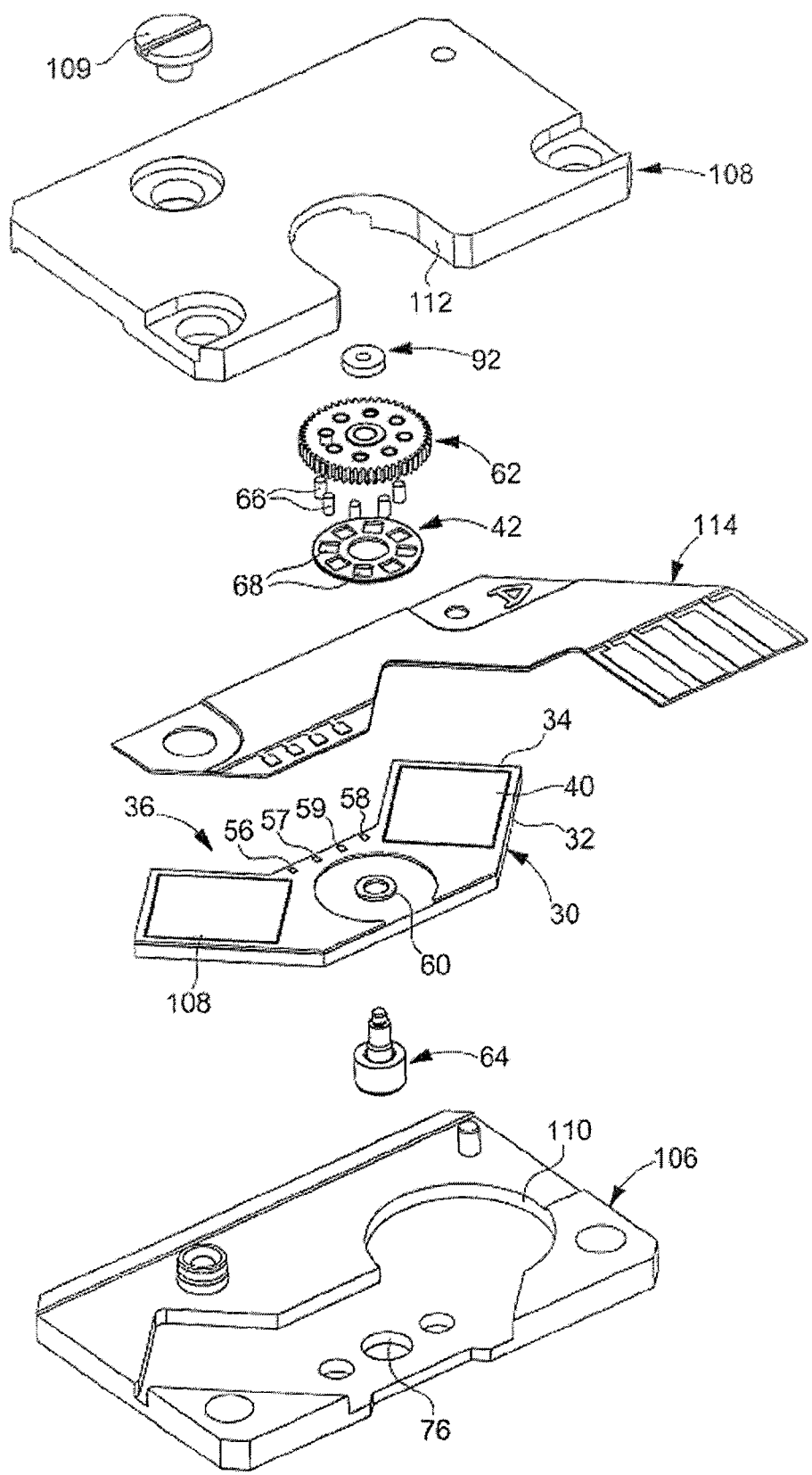
FIG. 4 is an exploded perspective view which represents the driving module of FIG. 2 and the casing which surrounds this driving module.
Figure 5:
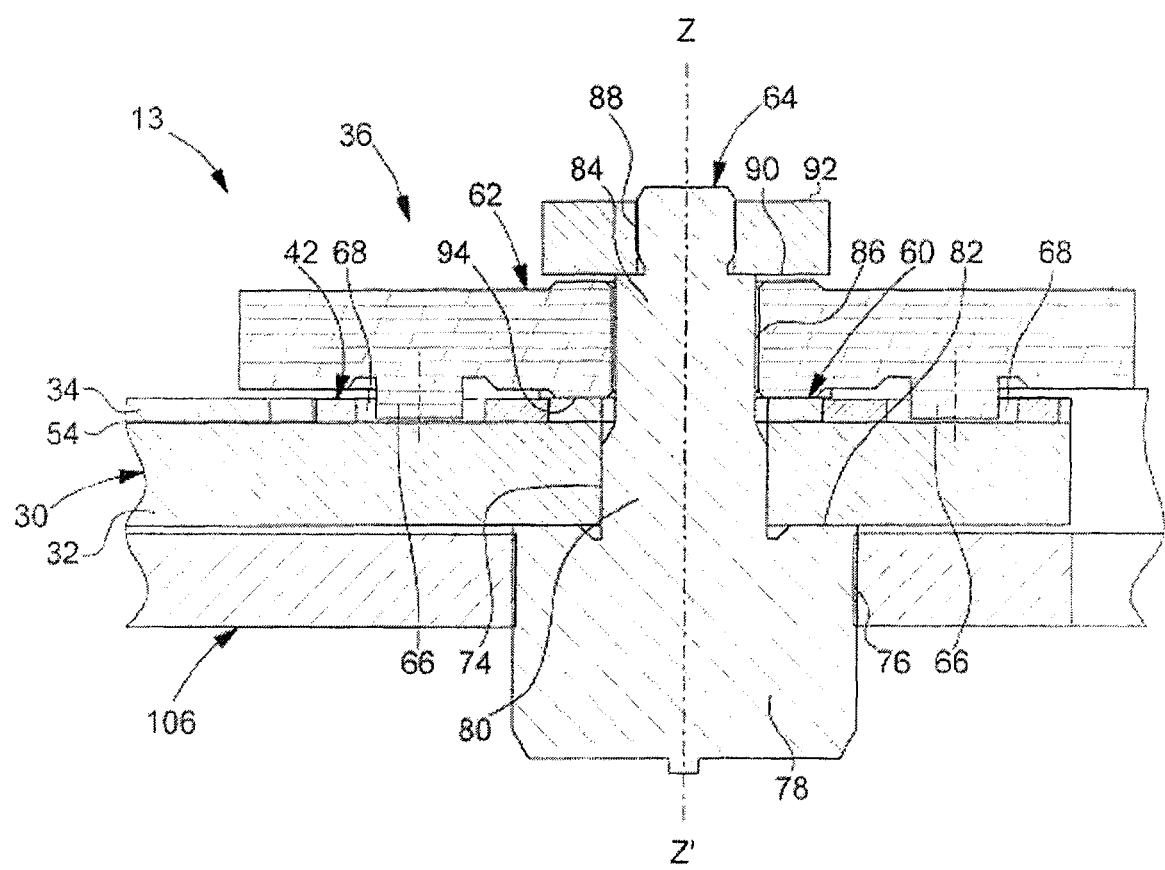
FIG. 5 is an enlarged view in axial section according to the plane 5-5 which represents schematically a portion of the driving module and which illustrates the rotational assembly of a pinion and of a rotor of the micromotor about a shaft.
Figure 6:
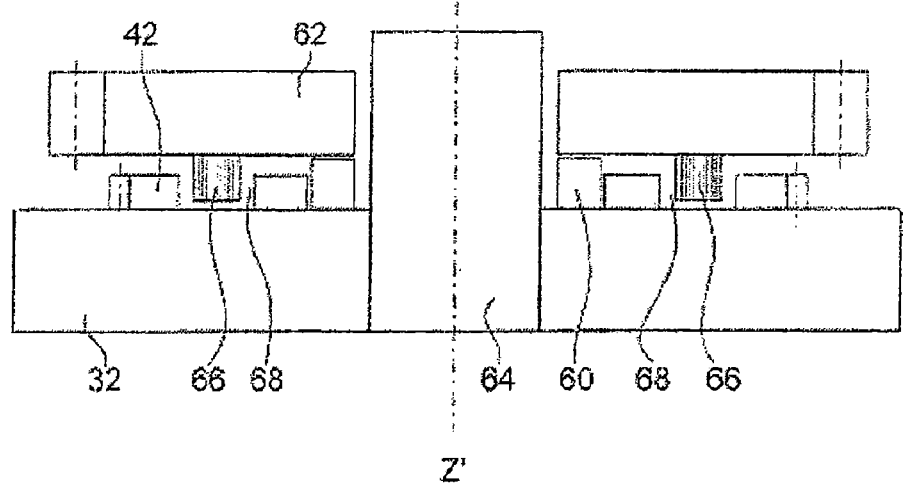
FIG. 6 is a schematic view in axial section according to the plane X'X which illustrates the driving of the pinion by the rotor by means of pins.

According to the embodiment represented in particular in FIGS. 4 and 5, the axis of rotation z'z of the pinion 62 is formed by a stepped shaft 64 made of profil-turned metal which is inserted into the plate 30 through a first hole 74 produced in the substrate 32 and which is driven into a second hole 76 produced in a plate 106 of the casing 12. In this embodiment, the radial forces applied on the shaft 64 are taken up by the plate 106.

The shaft 64 comprises a lower end section 78 which, with a lower intermediate section 80, delimits a first shoulder surface 82 orientated towards the top and coming to abut axially against the lower face of the plate 30. The lower intermediate section 80 has a diameter substantially equal to the diameter of the first hole 74 and extends into this hole 74. The shaft comprises an upper intermediate section 84 of a slightly lesser diameter than the lower intermediate adjacent section 80 and which extends into the boring 86 of the pinion 62 in order to guide it in rotation. The upper intermediate section 84 delimits, with the upper end section 88, a second shoulder surface 90 against which a fixing ring 92 is maintained axially abutting, said fixing ring being driven onto the upper end section 88.

As the rotational guidance of the rotor 42 is produced by the bearing 60 which is produced by a photolithographic etching process in the same manner as the first hole 74 which determines the centring of the shaft 64 relative to the bearing 60, very good centring of the shaft 64, of the pinion 62, of the bearing 60 and of the rotor 42 is obtained.

Furthermore, the lower face of the pinion 62 comprises, opposite the bearing 60, a bulge 94 which prevents the pinion 62 from coming to abut axially against the rotor 42, in particular in the case of pivoting, which avoids impairment of the rotor 42.

Figure 8:
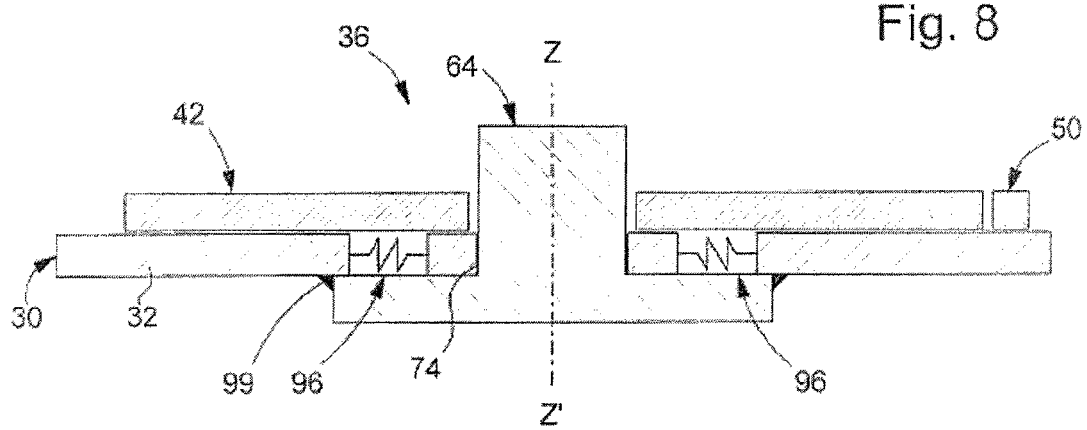
FIG. 8 is a schematic view in axial section according to the plane X'X which illustrates a variant of the assembly of the shaft relative to the rotor.
Figure 9:
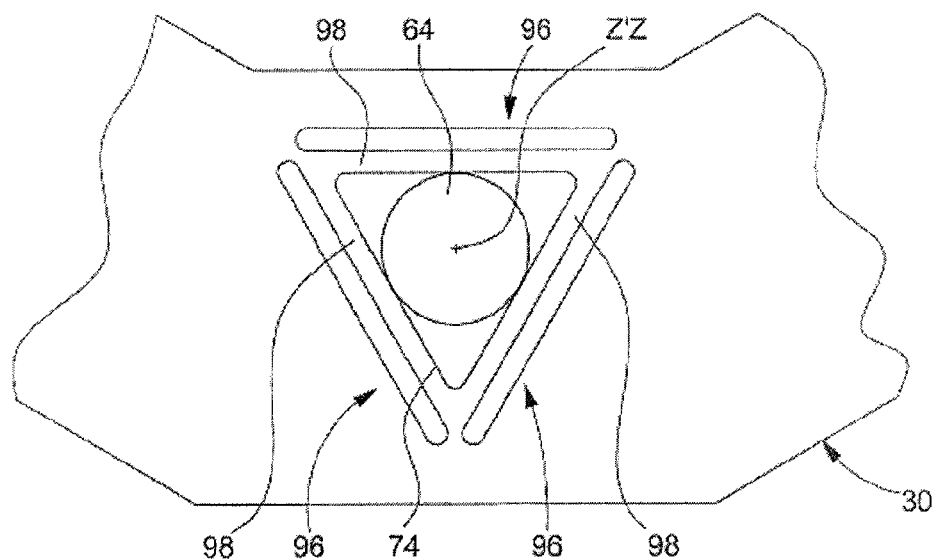
FIG. 9 is a view from below which represents schematically the elastic fixing structures which are provided in the plate for clamping and centring the shaft according to the assembly of FIG. 8.

In FIGS. 8 and 9 there is represented another advantageous embodiment in which the shaft 64 is mounted in the plate 30 in the manner of a force-fit by means of elastic fixing structures 96 provided in the substrate 32 around the first hole 74. In this embodiment, the radial forces applied on the shaft 64 are taken up by the substrate 32 and therefore by the elastic fixing structures 96.

The elastic fixing structures 96 are formed here by flexible blades 98 which are formed by lithography in the rear face of the plate 30. The lithography of the front face, for the upper layer 34 comprising the pawls 48, 50 and the rotor 42, likewise being aligned and centred very precisely relative to the lithography of the rear face (error less then 1 micron) and the result is more precise guidance and centring than with an axle produced in a single piece with the plate 30, since the radial clearance (radial play) can likewise be reduced to 1 micron.

Thanks to this precise alignment and this centring, it is possible to dispense with the bearing 60 such that the rotor 42 is then guided in rotation directly by the shaft 64. Thus the shaft 64 can guide in rotation, at the same time, the rotor 42 and the pinion 62. As the shaft 64 is produced by profil-turning, which makes it possible to obtain very limited manufacturing tolerances, a very precise assembly is obtained, which ensures in particular reliable functioning of the actuators 38, 40. The rotor 42 is then guided by the external axial wall of the shaft 64.

The shaft 64 can finally be fixed in the plate 30 by a complementary fixing means, for example by welding to the substrate 32 by means of a welding seam 99 which is represented in FIG. 8, or even by glueing.

The problems of friction against the shaft 64 can be resolved by deposition of a solid thin layer on the external axial wall of the shaft 64 which makes it possible to reduce the friction between the parts.

The elastic fixing structures 96 can be chosen in particular from the examples described and represented in the document CH 695 395 or from other structures which can ensure precise centring and clamping of the shaft 64 on the plate 30, for example structures formed by flexible tongues with free ends.

Figure 3:
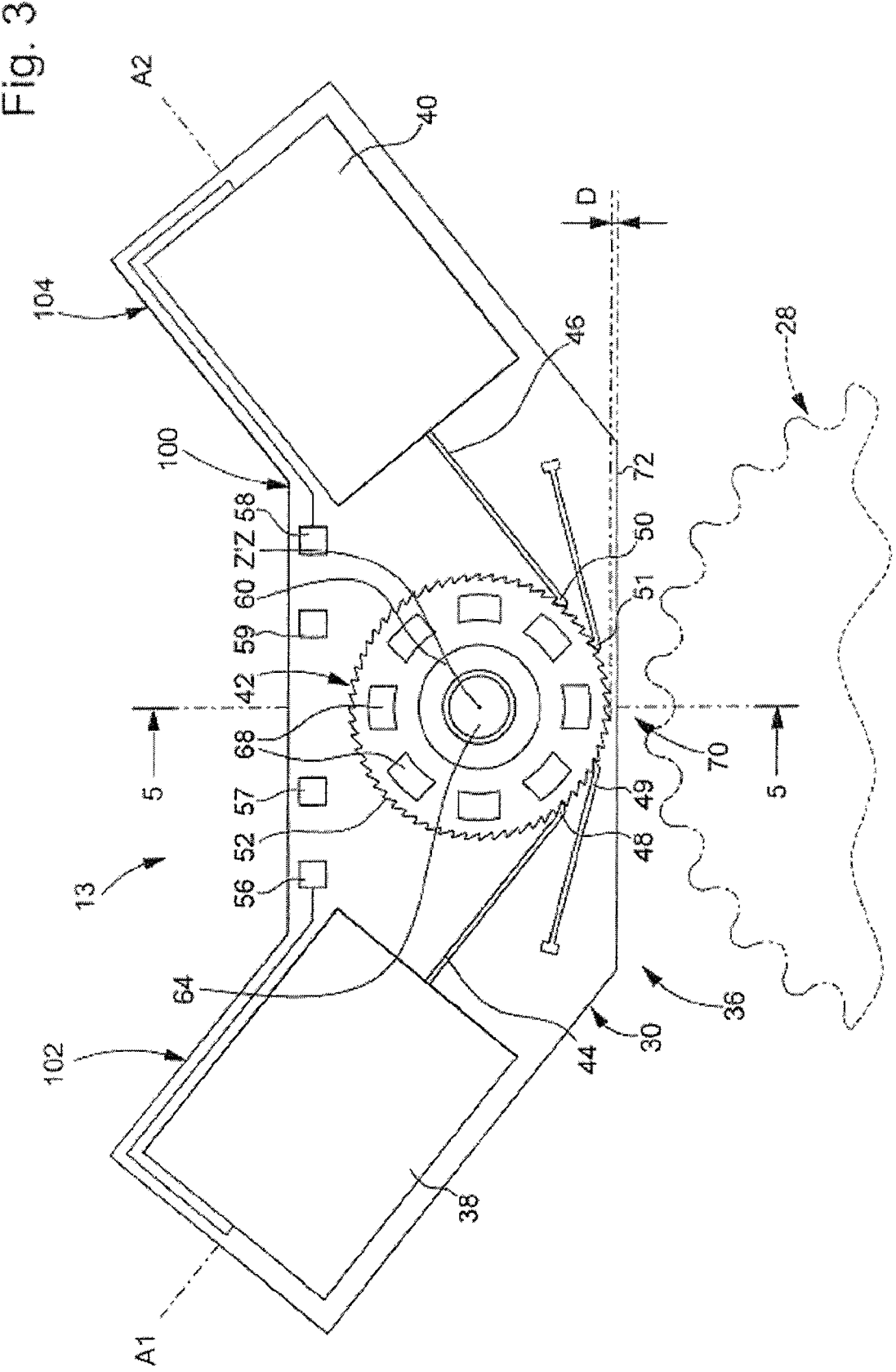
FIG. 3 is a view from above which represents schematically the driving module of FIG. 2.

Advantageously, considering in particular FIG. 3, the actuators 38, 40 describe together an angle of approx. ninety degrees, the bisector of this angle passing through the meshing zone 70 and through the axis of rotation z'z of the rotor 42 such that the driving module 13 has a general "V" shape which is defined by the exterior contour of the plate 30, this contour being optimised.

The plate 30 comprises a central portion 100 which carries the rotor 42 and two lateral portions 102, 104. The exterior contour of the plate 30 corresponds overall to the intersection of two rectangles which together are orthogonal and which form the two lateral portions 102, 104, with a transverse rectangle which forms the central portion 100, the transverse rectangle describing an angle of forty-five degrees relative to each of the two other rectangles. The major part of the surface of each lateral portion 102, 104 is occupied by an actuator 38, 40 whilst the major part of the surface of the central portion 100 is occupied by the rotor 42. The meshing zone 70 is provided near to one of the circumferential edges 72 of the central portion 100.

Preferably, the regions 56, 57, 58, 59 are arranged on the central portion 100, on the opposite side from the meshing zone 70 relative to the axis z'z of the rotor 42.

Figure 10:
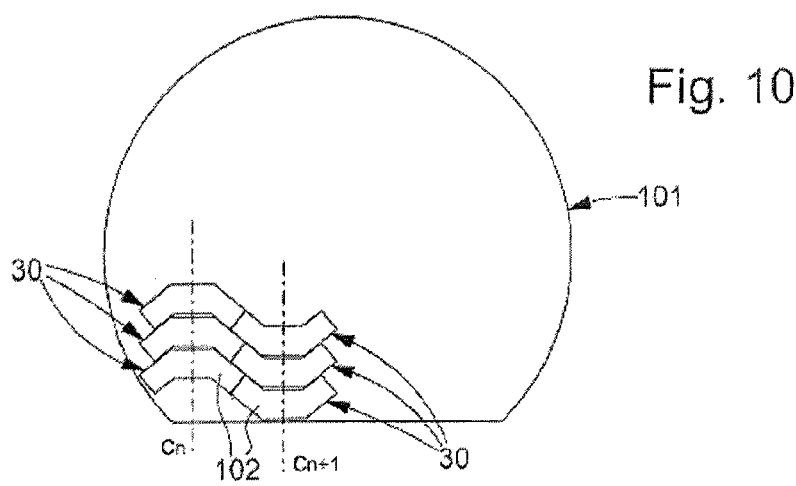
FIG. 10 is a view from above which represents schematically a silicon wafer and which illustrates an example of the arrangement of a plurality of micromotors on the wafer.

It can be seen that the "V" shape of the driving module 13 has the advantage of allowing optimisation of the efficiency of the micromotor 36 relative to the surface of the plate 30 which is used, and optimisation of the surface of crystalline or amorphous material which is used in order to produce the micromotors 36 and the driving modules 13. Hence when the plate 30 is produced from a silicon wafer 101, as shown schematically in FIG. 10, the "V" shape allows interleaved replication of the plates 30 on the surface of the wafer in order to maximise the number of micromotors 36 obtained from a given silicon surface. In particular, according to the example represented in FIG. 10, the plates 30 can be arranged on the wafer in parallel columns in the manner of chevrons, two columns Cn, Cn+1 which are adjacent being orientated in the opposite direction. Furthermore, two adjacent plates 30 of two adjacent columns Cn, Cn+1 have their lateral adjacent portions 102 which are aligned.

Preferably, the angle described by the two actuators 38, 40 is between ninety and one hundred and forty degrees. The greater is the angle, the more the interleaving of the plates 30 on the wafer 100 is optimised, but large angles require displacing the styli 44, 46 of the actuators 38, 40 relative to their respective axes of symmetry A1, A2, which impairs the mechanical effectiveness of the actuators 38, 40.

According to the embodiment represented in the Figures, the casing 12 which contains the driving module 13 comprises a lower plate 106 provided in order to be fixed on an element of the timepiece 10, here on the plate 12 of the movement, and the plate 30 of the driving module 13 is mounted on the lower plate 106. The casing 12 comprises a protective cap 108 which covers the driving module 13 which is fixed on the lower plate 106, here by means of a screw 109, and which retains the driving module 13 against the lower plate 106.

The upper face of the lower plate 106 comprises here a hollow or housing 110 in which the plate 30 of the driving module 13 is received in a substantially complementary manner.

The cap 108 comprises an open notch 112 in one of its exterior peripheral edges and the pinion 62 is accommodated in this notch 112 after assembly of the cap 108 on the lower plate 106.

Advantageously, a printed circuit 114 is intercalated between the lower plate 106 and the cap 108 in order to allow electrical connection of the micromotor 36, via its pads 56, 57, 58, 59 to the electronic module of the timepiece 10.

According to an embodiment variant (not represented), the driving module 13 can be mounted directly on the plate 26 which makes it possible to dispense with the casing 12, in particular to minimise the number of components, in order to facilitate the assembly of the movement 27 and in order to minimise the spatial requirement of the driving means. A protective element can be provided on the driving module 13 in order to protect its components.

What is claimed is:

1. An arrangement for mechanical interfacing of a micromotor of the Micro Electro Mechanical System type with a toothed wheel, the arrangement comprises:
   (i) a toothed wheel;
   (ii) a central shaft defining a central axis;
   (iii) a micromotor, produced in an upper layer of a plate made of crystalline or amorphous material, wherein the micromotor comprises at least one linear actuator;
   (iv) a rotor, arranged above the plate, wherein the rotor is driven in rotation by the at least one linear actuator;
   (v) a pinion coaxial with the rotor and arranged above the rotor, wherein the rotor is disposed to rotate about the central axis,
   wherein the rotor and the pinion are connected in rotation by at least one off-set pin that is received in an associated hole formed in the rotor so as to be disposed off a center of the rotor,
   wherein operating play is provided between the rotor and the pinion so that the rotor and the pinion are coupled in rotation angularly, said operating play including a radial clearance so that the rotor and the pinion move independently in a radial direction with respect to the axis of the central shaft, and
   wherein the pinion meshes with the toothed wheel.

2. The arrangement according to claim 1, wherein the rotor comprises a plurality of holes formed therein and distributed angularly in a regular manner about an axis of rotation of the rotor, and wherein there is an off-set pin associated with each hole, and the off-set pins are integral with the pinion, wherein the radial clearance is provided by clearance between surfaces forming the plurality of holes in the rotor and the off-set pins of the pinion.

3. The arrangement according to claim 2, wherein each hole of the plurality of holes has a length and a width, wherein the length is greater than the width, and the length is oriented in a radial direction with respect to the axis of the central shaft.

4. The arrangement according to claim 2, wherein the pins are produced in a single piece with the pinion.

5. The arrangement according to claim 2, wherein each pin is received in the associated hole with both radial and circumferential play.

6. The arrangement according to claim 1, wherein the upper layer of the plate comprises at least one support surface orientated towards a top of the plate and the pinion is disposed to abut against the at least one support surface, and is thus prevented from coming to abut axially against the rotor, when an axial force orientated towards a bottom of the plate is applied to the pinion.

7. The arrangement according to claim 1, wherein the rotor is guided in rotation by the central shaft.

8. The arrangement according to claim 7, wherein the rotor is guided in rotation by the same shaft as the pinion.

9. The arrangement according to claim 1, wherein the pinion meshes with the toothed wheel in a meshing zone situated close to an exterior circumferential edge of the plate.

10. The arrangement according to claim 9, wherein the rotor is driven in rotation by the actuator by means of a pawl and wherein the ratcheting zone is offset angularly relative to the meshing zone.

11. The arrangement according to claim 1, wherein the hole is formed as a slot.

12. A timepiece comprising an arrangement according to claim 1 mechanically interfacing the toothed wheel of a gear-train of the timepiece with the micromotor of the timepiece.

\* \* \* \* \*